(12) United States Patent
Quagliaro

(10) Patent No.: US 8,036,288 B2
(45) Date of Patent: Oct. 11, 2011

(54) ULTRA-WIDEBAND COMMUNICATION SYSTEM PROVIDED WITH A FREQUENCY CONTROLLED DISPERSIVE ANTENNA

(75) Inventor: Gilles Quagliaro, Cormeilles En Parisis (FR)

(73) Assignee: Thales (FR)

( * ) Notice: Subject to any disclaimer, the term of this patent is extended or adjusted under 35 U.S.C. 154(b) by 552 days.

(21) Appl. No.: 12/092,728

(22) PCT Filed: Nov. 10, 2006

(86) PCT No.: PCT/EP2006/068332
§ 371 (c)(1),
(2), (4) Date: Oct. 15, 2008

(87) PCT Pub. No.: WO2007/054559
PCT Pub. Date: May 18, 2007

(65) Prior Publication Data
US 2009/0122840 A1     May 14, 2009

(30) Foreign Application Priority Data
Nov. 10, 2005   (FR) ...................... 05 11456

(51) Int. Cl.
H04L 27/28    (2006.01)
H04B 1/00     (2006.01)

(52) U.S. Cl. ........................................ 375/260; 375/130
(58) Field of Classification Search .......... 375/130–131, 375/219, 260, 285, 295; 340/870.18, 870.24, 340/870.26
See application file for complete search history.

(56) References Cited

U.S. PATENT DOCUMENTS

| | | | | |
|---|---|---|---|---|
| 5,351,053 A | * | 9/1994 | Wicks et al. | 342/158 |
| 5,471,223 A | * | 11/1995 | McCorkle | 343/786 |
| H1773 H | * | 1/1999 | Cheston et al. | 342/375 |
| 7,133,646 B1 | * | 11/2006 | Miao | 455/73 |
| 2005/0232134 A1 | | 10/2005 | van Nee | |
| 2008/0297415 A1 | * | 12/2008 | Berens et al. | 342/372 |
| 2009/0079620 A1 | * | 3/2009 | Van Caekenberghe et al. | 342/200 |

* cited by examiner

Primary Examiner — Khanh C Tran
(74) Attorney, Agent, or Firm — Lowe Hauptman Ham & Berner, LLP

(57) ABSTRACT

Radiocommunication equipment and method comprising at least the following elements: at least one frequency scan antenna connected to a modem adapted to generate a spectrum OFDM modulation-based waveform by increasing the duration of an OFDM symbol by reproducing the FFT pattern.

12 Claims, 6 Drawing Sheets

ULTRA-WIDEBAND COMMUNICATION SYSTEM PROVIDED WITH A FREQUENCY CONTROLLED DISPERSIVE ANTENNA

CROSS-REFERENCE TO RELATED APPLICATIONS

The present Application is based on International Application No. PCT/EP2006/068332, filed on Nov. 10, 2006, which in turn corresponds to French Application No. 05 11456, filed on Nov. 10, 2005 and priority is hereby claimed under 35 USC §119 based on these applications. Each of these applications are hereby incorporated by reference in their entirety into the present application.

The invention relates notably to an ultra-wideband (UWB) radiocommunication system based on an OFDM (Orthogonal Frequency Division Multiplex) modem with spread spectrum and a Frequency Scan Antenna (FSA).

It applies in the field of broadband, short range radiocommunication, radiolocation, mainly in the millimeter band.

BACKGROUND OF THE INVENTION

The depletion of the spectrum available for communications is pushing toward the use of ever higher frequencies.

Furthermore, faced with the expansion of the cable network (ADSL, optical fibers), a radiocommunication service will be justified in the future essentially by a need for mobility.

Mobility assumes omnidirectionality of the antenna system. Unfortunately, the size and therefore the energy sensitivity of an omnidirectional antenna decreases with the frequency. Very high frequencies are therefore by nature difficult to make it compatible with mobility, without abandoning omnidirectional antennas in order to use directive antennas, the difficulty then being to be able to aim the latter dynamically and virtually instantaneously. Three solutions can currently be envisaged according to the prior art.

The motorized parabolic antenna is the conventional and well-known solution. One of its disadvantages is its very poor aiming agility. The aiming of the beam, relying on mechanical motorization, is not instantaneous. It is reserved for point-to-point and not very mobile configurations.

The phase-shift electronic scan antenna allows instantaneous aiming, but it is a solution that is technologically difficult and prohibitively costly. In addition, in point-to-multipoint configuration, it requires using a time division multiple (TDMA) access protocol which is not optimal in the matter of latency in the transmission delay or in the matter of power allocation.

The frequency scan antenna FSA allows instantaneous aiming. It is a proven and low-cost technique similar to the prism in optics. The aiming direction depends on the frequency and the frequency therefore makes it possible to control the aiming direction.

SUMMARY OF THE INVENTION

The invention relates notably to radiocommunication equipment characterized in that it comprises in combination at least the following elements: at least one frequency scan antenna connected to a UWB-OFDM modem adapted to generate a spectrum OFDM modulation-based waveform by increasing the duration of an OFDM symbol by reproducing the Fast Fourier Transform (FFT) pattern.

The modem uses, for example, a direct-sequence spread spectrum (DSSS).

The invention also relates to a spread spectrum method based on the OFDM technique, characterized in that a UWB-OFDM modem is used and in that it comprises at least one step in which the duration of an OFDM signal is increased by reproducing the FFT pattern to generate a waveform and this waveform is transmitted to a frequency scan antenna.

A spread factor equal to at least $T*dF=2$ is used for example.

The method applies for example a DSSS sequence to the rest of the patterns of the OFDM symbol.

The invention also relates to a radiocommunication method comprising at least the following steps:
  Generate an OFDM modulation-based waveform by using a UWB-OFDM modem increasing the duration of an OFDM symbol by reproducing the FFT pattern,
  Transpose the waveform into a frequency band adapted to a given frequency scan antenna,
  Transmit the waveform to a receiver.

The equipment and the spread spectrum method having at least one of the aforementioned features are for example used for communicating data to terminals situated in different directions.

The equipment may also be used in a system comprising an interrogator fitted with a frequency scan antenna and a modem and a transponder, characterized in that a transponder is interrogated by transmitting a waveform generated by the spread spectrum method, the interrogation signal received by the transponder is spectrally analyzed and the position of the transponder relative to the mechanical axis of the frequency scan antenna FSA of the interrogator is determined using spectral analysis.

The present invention notably proposes the advantages of supplying low-cost equipment, for example radiocommunication, radioidentification and radiolocation equipment, with the benefit of the following properties:

1—antenna gain in all traffic directions,
2—the possibility of simultaneous communications with the fixed or mobile terminals situated in different directions,
3—optimized sharing of transmission power installed between the various directions served,
4—capitalization of the multipaths or protection against the multipaths, and
5—the possibility of carrying out angular error measurement with distance report.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE DRAWINGS

Figure 1:
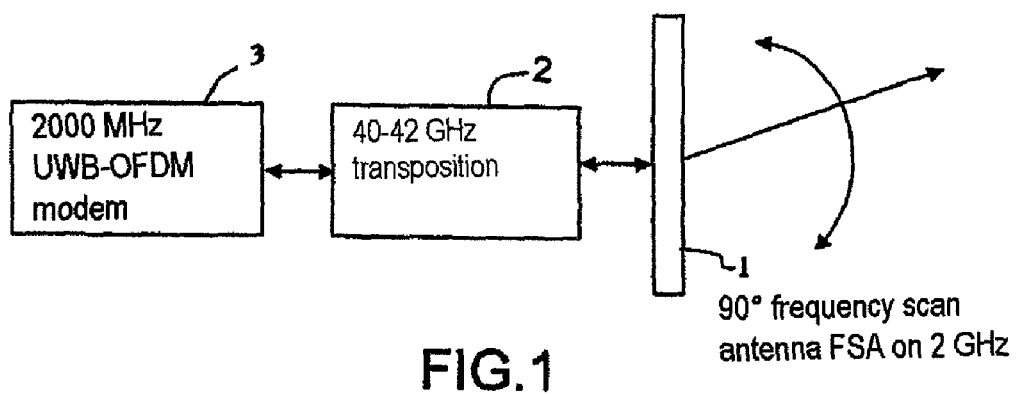
FIG. 1, a general block diagram of the system according to the invention.

FIG. 1 represents a block diagram of the system according to the invention. The application is given as an illustration for a 40 GHz millimeter band radiocommunication system of the local radio network or radio LAN (Local Area Network) type with typical ranges of 100 m to 1000 m.

FIG. 1 shows a system comprising an FSA antenna 1, a device 2 suitable for carrying out a frequency transposition and a modem 3 of the spread spectrum UWB-OFDM type according to the invention.

In this example, the modem 3 addresses an instantaneous band that can be programmed up to 2000 MHz approximately through an FFT of typically 64 to 256 points.

The frequency transposition is assumed to carry the traffic band of the modem between 40 and 42 GHz for the present example.

Figure 2:
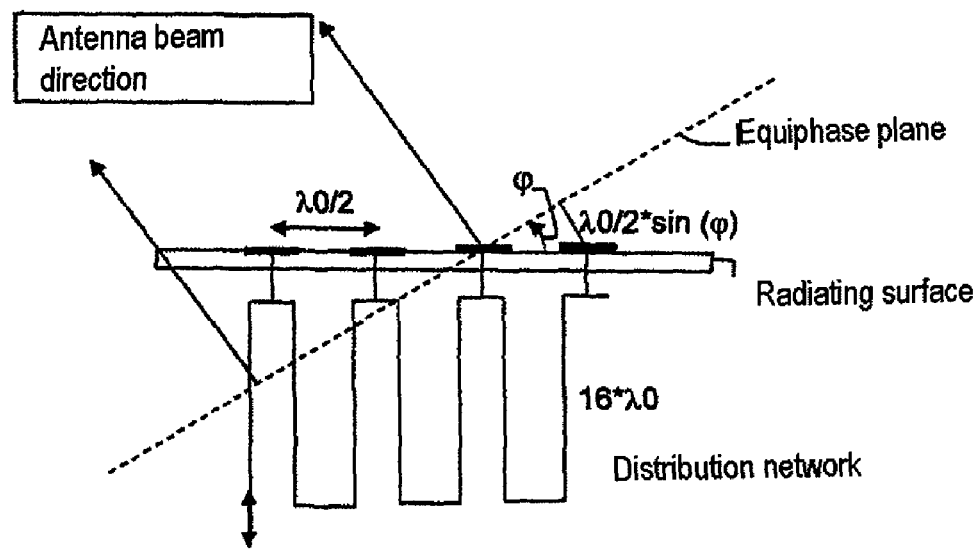
FIG. 2, the schematic diagram of a frequency scan antenna FSA.

FIG. 2 gives a schematic diagram of an FSA antenna. The radiating elements, spaced at $\lambda_0/2$ on the radiating face of the antenna, are supplied in series by long lines, in this example $16\lambda_0$ long ($\lambda_0$ being the wavelength in a vacuum at the central frequency $f_0$).

In these conditions, the phase shift between two consecutive radiating elements at the wavelength frequency $\lambda$ is equal to:

$$-(2\pi/\lambda)*(16\lambda_0)+16*2*\pi \text{(a value between } -\pi \text{ and } \pi, \text{ zero for } \lambda=\lambda_0)$$

This phase shift produces an angular beam misalignment $\phi$ such that the phase shift between two consecutive radiating elements is equal to $(2\pi/\lambda)*(\lambda 0/2*\sin(\phi))$, a value between $-\pi$ and $\pi$, zero for $\phi=0$.

Equality between the two expressions above gives:

$$\sin(\phi)=32*(1-\lambda/\lambda_0)=32*(f_0/f-1)$$

where $f$ and $f_0$ are the frequencies corresponding to the wavelengths $\lambda$ and $\lambda_0$.

It is noted that the beam is positioned in the axis at the central frequency ($f_0$ taken in this example to be 41 GHz) and becomes misaligned as soon as the frequency is changed, for example:
Frequency=40 GHz $\phi=53°$
Frequency=41 GHz $\phi=0°$
Frequency=42 GHz $\phi=-50°$ The wavelength at 40 GHz is equal to 7.5 mm, the electric length of the distribution circuit between the radiating elements is equal to 16*7.5 mm or 120 mm, which can be implanted after aliasing on a circuit of a little more than 6 cm at the sides according to a diagram indicated in FIG. 3. The total electric length of the distribution circuit is 15*120 mm, or 1.8 m. An embodiment in the form of metal or metallized plastic waveguides notably makes it possible to limit the radiofrequency losses.

Figure 3:
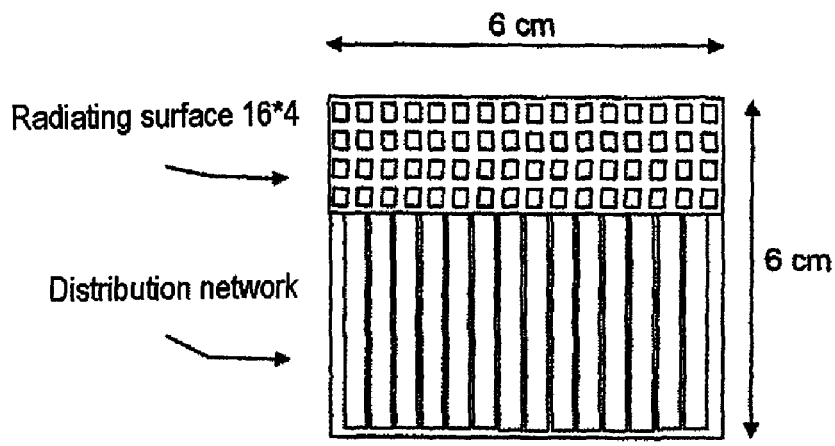
FIG. 3, an exemplary embodiment of a frequency scan antenna FSA.

FIG. 3 shows an exemplary embodiment comprising an FSA antenna of the 16*4 elements (patches) type having a directivity in the axis of 22 dBi and a beam of approximately 8 degrees aperture in relative bearing and 30 degrees in elevation (aperture at 3 dB).

With 2000 MHz of instantaneous band, the modem addresses an angular sector of approximately 103 degrees, or approximately 16 consecutive beams which allows both an angular discrimination and the availability of 100 MHz of band per aimed direction (100 Mbps capacity per direction).
UWB-OFDM Spread Spectrum Modem Frequency scan antennas FSA require the manipulation of very wide frequency bands, much wider than the traffic payload rate (in our example: 2000 MHz for 100 Mbps). To use the method according to the invention, the UWB-OFDM technology for example is used.

Figure 4:
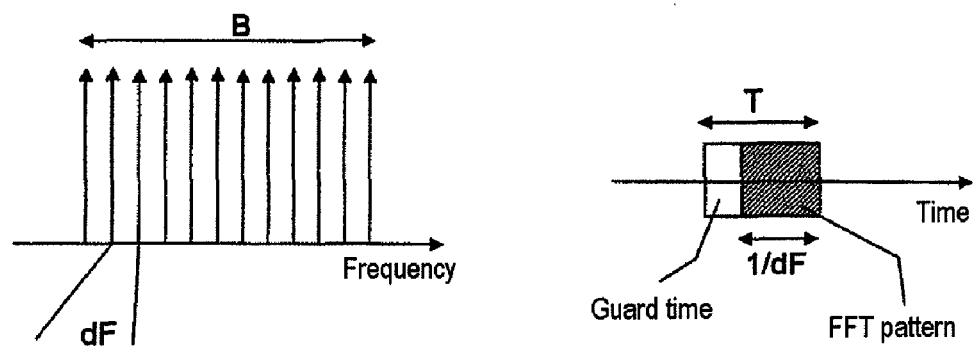
FIG. 4, a conventional OFDM symbol.

Note that FIG. 4 explains the principle of construction of a conventional OFDM symbol. An OFDM symbol with a duration T consists of a series of carriers evenly spaced in frequency (dF) on a B band. Each carrier is, by definition, a sine wave modulated by a phase-amplitude coefficient that is constant over the duration of the symbol, all the phase-amplitude values of the individual carriers constituting the information transmitted by the symbol. By definition, such a signal is periodic in time with a period 1/dF, the periodic pattern being the FFT (Fast Fourier Transform) pattern.

To obtain a spread spectrum effect according to the invention, the idea consists in prolonging the duration T of an OFDM symbol by a simple identical repetition of the FFT pattern (period 1/dF) as many times as desired. The digital-analog converter of the modem works at the frequency B by virtue of the Nyquist principle, the other units of the modem being able to work at reduced frequency 1/T. The spectrum of the OFDM symbol then shows some "void" between each carrier, and the frequency-offset symbols of n/T, n integer, $0<n<T*dF$ are orthogonal to one another. The coefficient $T*dF$ may be considered a spread spectrum factor.

Figure 5:
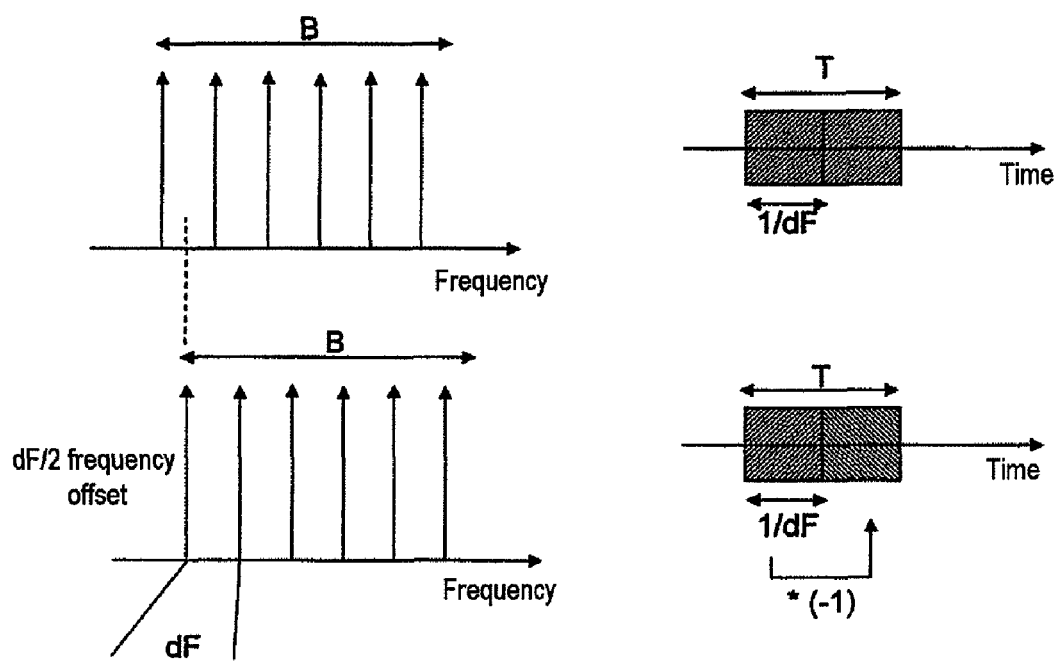
FIG. 5, a frequency spread OFDM symbol.

This principle is illustrated by FIG. 5 for a spread factor $T*dF=2$ (in practice, higher values will often be taken).

Each carrier can be modulated and demodulated individually, which is important since each carrier is intended to serve different directions according to the invention.

The accuracy of synchronization required in time for the demodulation is in relation to the symbol duration T, and not 1/B, as conventionally for B band modulations. In our example, B=2000 MHz and 1/B=0.5 ns. For a 128-point FFT, $B/dF=128$ and $T=(T*dF)*128/B$. A spread coefficient $T*dF=2$ gives $T=256/B=128$ ns. A spread coefficient of $T*dF=16$ gives a symbol duration $T=1024$ ns which is very manipulable.

It is therefore possible easily to dimension and implement a very wide band signal making it possible to use the FSA antenna by using an appropriate digital-analog converter.

Note that, in FIG. 5, the dF/2 offset symbol comprises two FFT patterns in phase opposition, whereas the symbol that is not offset comprises two identical FFT patterns.

Figure 6:
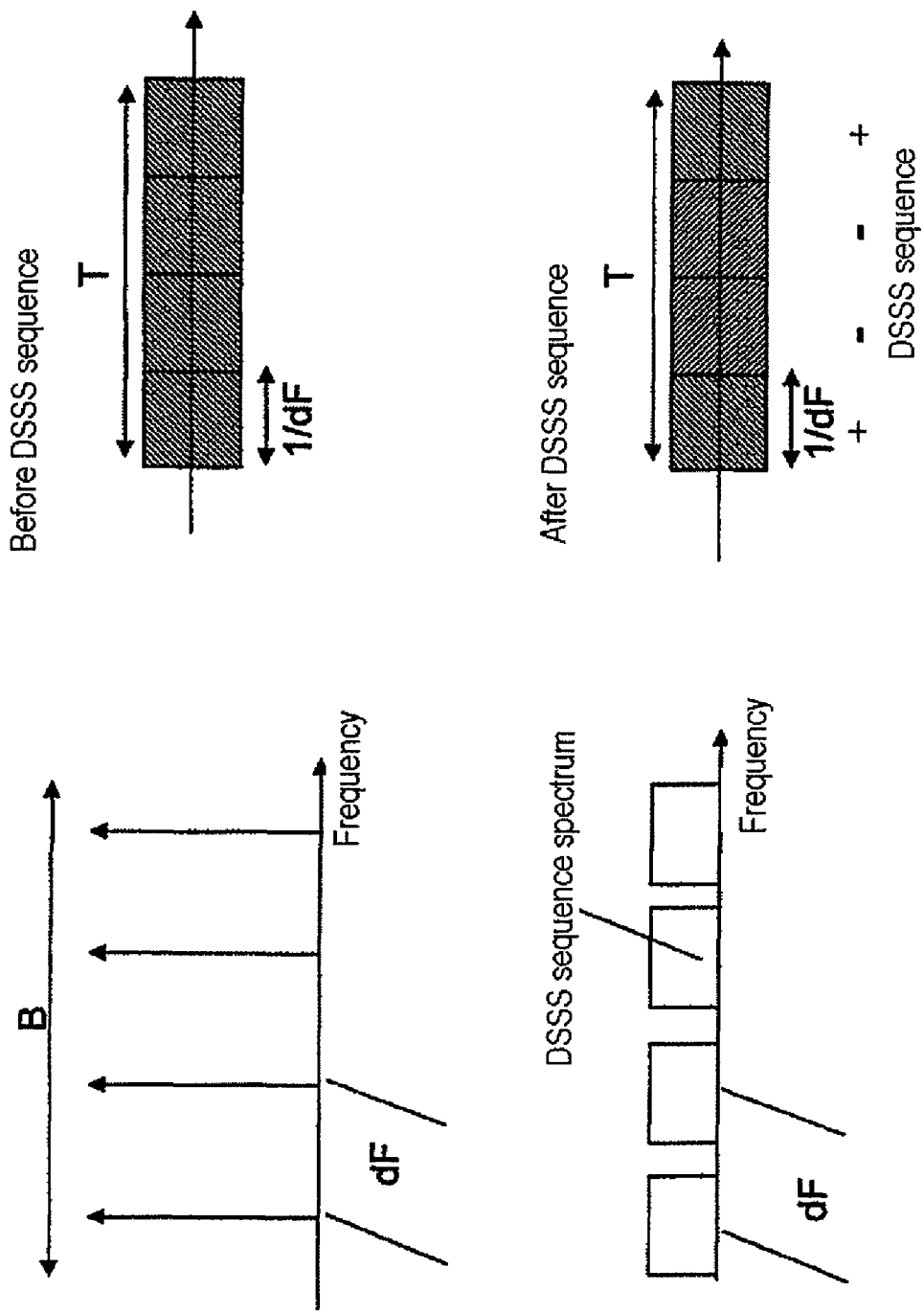
FIG. 6, a frequency spread OFDM symbol with DSSS overmodulation.

This can be generalized by applying a DSSS (Direct Sequence Spread Spectrum) to the series of the FFT patterns of the OFDM symbol according to the invention. FIG. 6 represents such a symbol for a spread factor $T*dF=4$.

Each OFDM spectrum carrier is modulated with the same DSSS sequence and can therefore be modulated and demodulated individually, which is important since each carrier is designed to serve a different direction according to the invention. In this exemplary application, a virtually uniform spectral density is obtained over the whole B band, and is therefore "discrete".

FIGS. 7 to 10 give various exemplary applications of the invention and their advantages.

Antenna Gain in All Directions

Figure 7:
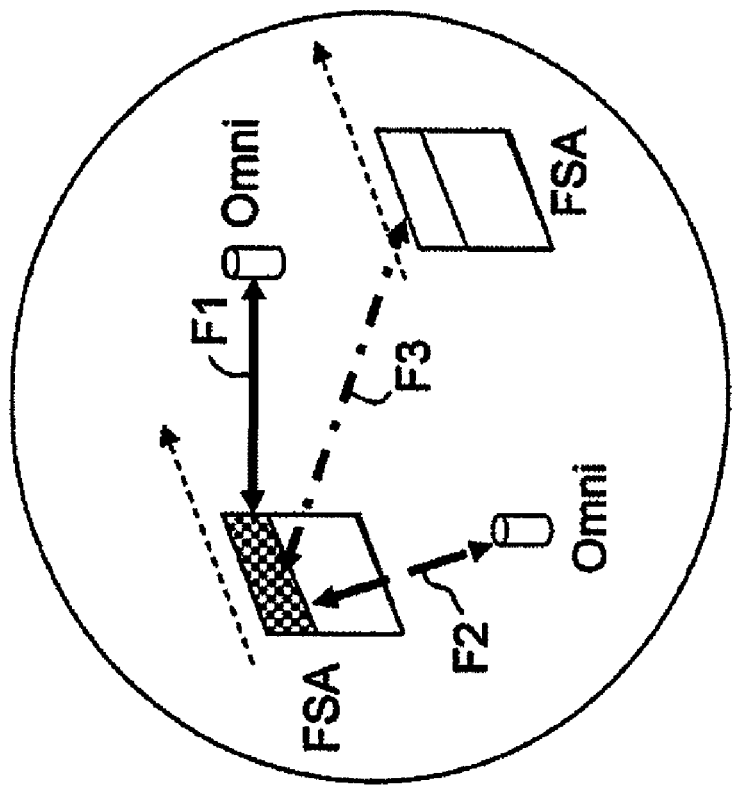
FIG. 7, the diagram of a point-to-multipoint communication demonstrating the advantage of an antenna gain in all traffic directions, FIG. 8, the diagram of a point-to-multipoint communication demonstrating the capability of simultaneous communications and of optimal power sharing, FIG. 9, an example of point-to-multipoint communication in the presence of multipaths, and FIG. 10, a block diagram of a radioidentification-location system.
Figure 7:
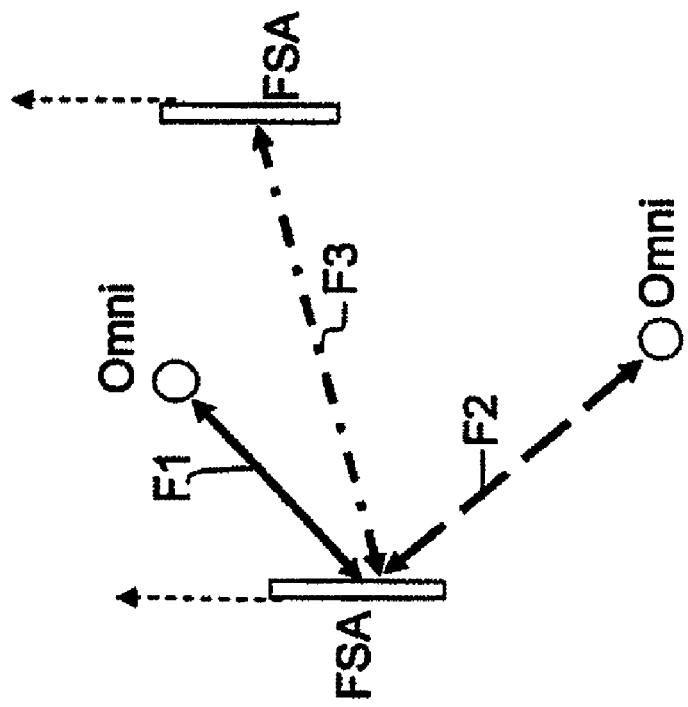

FIG. 7 represents a typical network topology of a system according to the invention comprising FSA antenna terminals and omnidirectional antenna terminals (with a view in perspective to illustrate the parallel position of the FSA antennas). The FSA antennas must be physically oriented in the same direction, either on installation or by a compass-controlled automatic positioner.

To highlight the benefit of FSA antennas, it is possible to use the following numbered link budget, with reference to the exemplary embodiment already described:

| | | | |
|---|---|---|---|
| Free space | | 92 | DB/GHz/km |
| Distance | 100 m | −20 | dBkm |
| Frequency | 41 GHz | 32 | dBGHz |
| "Rain" margin | 4 dB/km | 0.4 | DB |
| PROPAGATION | | 105 | DB |
| Band width | 2000 MHz | 33 | dBMHz |
| noise | | 6 | dB |
| Chain losses | | 2 | dB |
| C/N BER = 10 − 6 | | 6 | dB |
| Transmitted power | | 14 | dBm |
| System value | | 81 | DB |
| Total gain for the antenna | | 24 | dBi |
| FSA ANTENNA GAIN | | 19 | dBi |
| OMNI ANTENNA GAIN | | 5 | dBi |

From this numbered link budget, it is deduced that:

1—facing terminals fitted with an omnidirectional antenna, the terminal fitted with an FSA antenna can transmit in free space, at 100 m, a traffic load of 2000 Mbps (that is 20 different directions at 100 Mbps each), 2—facing terminals fitted with an FSA antenna, provided that the latter are all aligned in the same direction, the terminal fitted with an FSA antenna can transmit in free space, at 1000 m, a traffic load greater than 200 Mbps (that is two different directions at 100 Mbps), 3—omnidirectional terminals can exchange with one another traffic loads at best equal to 70 Mbps at 100 m and 0.3 Mbps at 1000 m.

Figure 8:
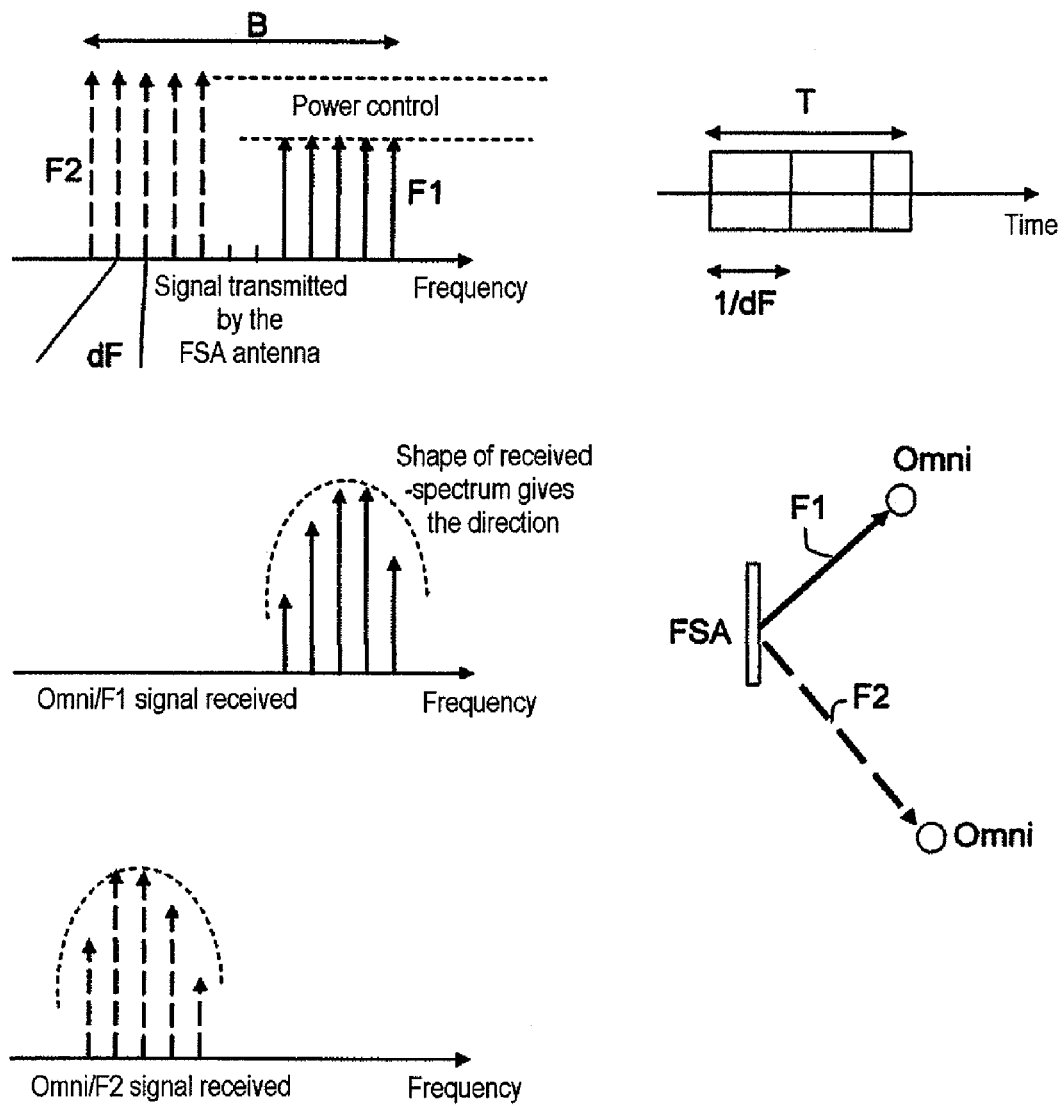

Simultaneous Communications with the Fixed or Mobile Terminals Situated in Different Directions FIG. 8 illustrates the classic case of a point-to-multipoint configuration. The UWB-OFDM modem in this instance serves two links at the same time in two different directions, each in its particular frequency band relating to its direction, and therefore simultaneously by frequency multiplexing. The carriers corresponding to unused directions are not transmitted.

Optimization of Installed Transmission Power-Sharing between the Various Directions Served In FIG. 8, the transmission powers are adjusted optimally for each link, by simply weighting individual carriers of the OFDM symbol. It is therefore possible to give more power to the links requiring it (in this instance F2), by taking it from the links having power to spare (in this instance F1).

Capitalization and Resistance to Multipaths

Figure 9:
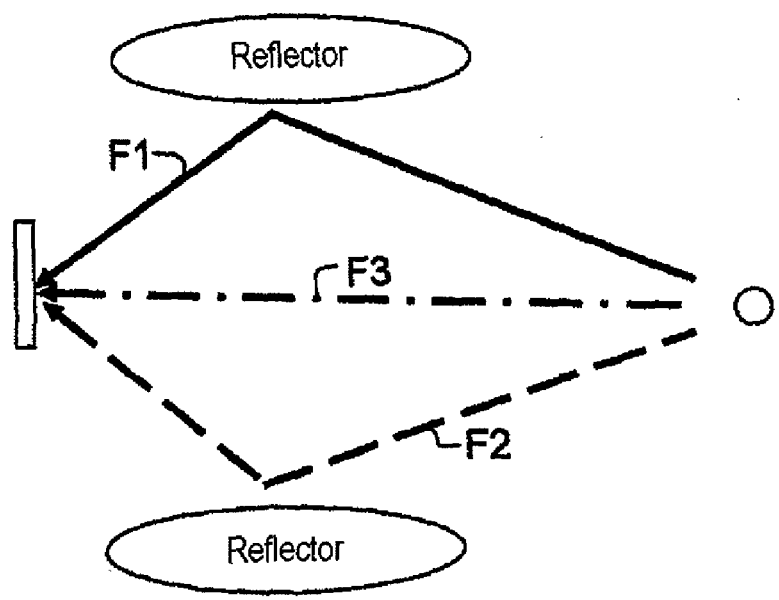

FIG. 9 represents a network topology in which an omnidirectional antenna terminal is presented to an FSA antenna terminal in the presence of natural or artificial reflectors. Since each reflection corresponds to a different direction, and therefore a different frequency, each propagation radio path, direct or reflected, may be served independently by frequency multiplexing, thereby allowing the system to capitalize on the best.

The same configuration of FIG. 9 with two FSA antennas leads to the elimination of the paths by spatial filtering to the benefit of the direct path, which in this case represents defensive protection against multipaths.

Angular Error Measurement, Radioidentification and Radiolocation

Figure 10:
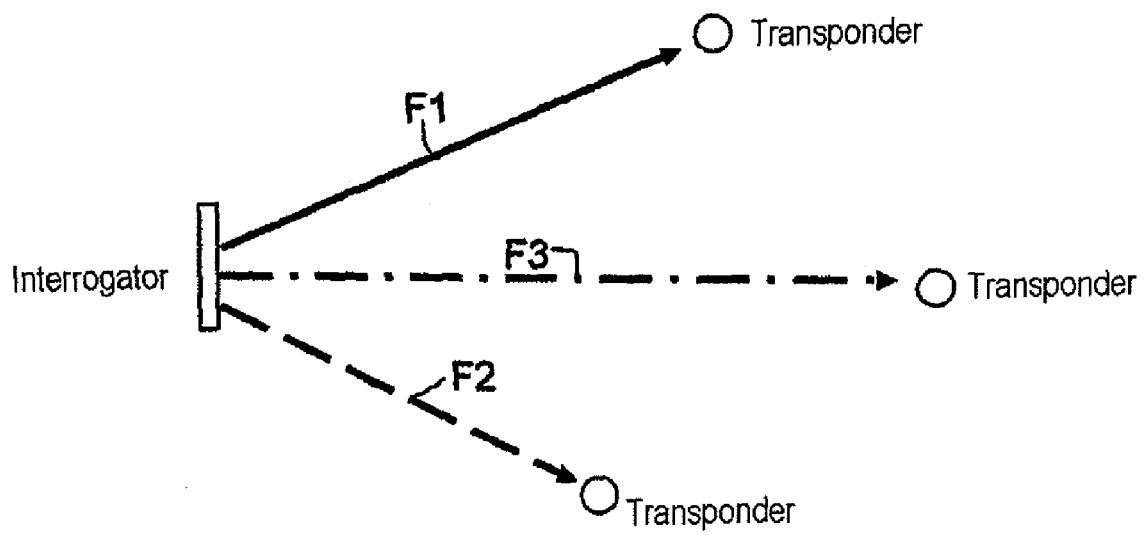

FIG. 10 indicates a typical radioidentification-location configuration.

A classic problem of the radioidentification function is how difficult it is for an "interrogator" to interrogate a "transponder" situated in a precise direction without having to "wake up" its neighbors.

The idea of the invention consists in interrogating only once with a very wide band signal of the UWB-OFDM type obtained by applying the steps described above. The interrogation signal received by the transponder is spectrally analyzed. This spectral analysis allows the transponder to immediately identify its position relative to the mechanical axis of the FSA antenna of the interrogator and therefore to respond accordingly.

From this error-measurement function there follows an angular plotting function that can reach $1/10°$ of beam (that is 1 to 8 degrees in our example).

In addition, the 100 MHz instantaneous band makes it possible to envisage a distance plotting of the order of one meter.

Very Low Spectral Density Radiocommunication

By using the −41.25 dBm/MHz EIRP limitation defined by the FCC for the UWB in the perspective of maximum discretion, and by using the 20 dBi receive gain FSA antennas, the achievable data rate performance is 20 Mbps at 10 m and 0.2 Mbps at 100 m. These performances would have been only 0.2 Mbps at 10 m and 0.002 Mbps at 100 m in a classic UWB design.

Without departing from the scope of the invention, the steps explained above are applicable to other frequencies, particularly each time the user has a sufficient bandwidth and the location necessary to house the antenna.

One field of application is Wimax according to the $802.16^e$ standard, notably for the advanced radio techniques aspects envisaged in the $802.16^e$ standard concerning transmit and receive diversity, and concerning the smart antenna, adaptive antenna system. A preferred field of application could be the 40.5 GHz to 42.5 GHz band.

Another field of application is the UWB in the 3.1 to 10.6 GHz band, as defined by the FCC and as envisaged by the OFDM multiband organization as under reference MBOA-SIG —multiband OFMD for low spectral density transmissions not exceeding −41.25 dBm/MHz.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. Radiocommunication equipment comprising: at least one frequency scan antenna (FSA) connected to an ultra-wideband-Orthogonal Frequency Division Multiplex (UWB-OFDM) modem adapted to generate a spectrum OFDM modulation-based waveform by increasing a duration of an OFDM symbol by reproducing a Fast Fourier Transform (FFT) pattern.

2. The equipment as claimed in claim 1, comprising at least one modem using a direct-sequence spread spectrum (DSSS) sequence.

3. The equipment as claimed in claim 2, wherein the equipment is adapted to communicate data to terminals situated in different directions.

4. The equipment as claimed in claim 1, wherein the equipment is adapted to communicate data to terminals situated in different directions.

5. A system comprising the radiocommunication equipment as claimed in claim 1, said system comprising an interrogator fitted with the at least one FSA and a modem and a transponder, wherein the transponder is interrogated by transmitting a waveform generated, an interrogation signal received by the transponder is spectrally analyzed and a position of the transponder relative to a mechanical axis of the at least one FSA of the interrogator is determined using spectral analysis wherein the duration of an OFDM symbol is increased by reproducing the FFT pattern to generate a waveform and the waveform is transmitted to a frequency scan antenna.

6. A spread spectrum method based on an Orthogonal Frequency Division Multiplex (OFDM) technique, wherein an ultra-wideband-Orthogonal Frequency Division Multiplex (UWB-OFDM) modem is used, the method comprising at least one step in which a duration of an OFDM symbol is increased by reproducing a Fast Fourier Transform (FFT) pattern to generate a waveform and this waveform is transmitted to a frequency scan antenna.

7. The method as claimed in claim 6, wherein the method uses a spread factor equal to at least $T*dF=2$ with T being the duration of an OFDM symbol and $1/dF$ being the FFT pattern period.

8. The method as claimed in claim 7, wherein the UWB-OFDM modem communicates with data to terminals situated in different directions.

9. The method as claimed in claim 6, wherein a direct-sequence spread spectrum (DSSS) sequence is applied to a series of patterns of the OFDM symbol.

10. The method as claimed in claim 9, wherein the UWB-OFDM modem communicates with data to terminals situated in different directions.

11. The method as claimed in claim 6, wherein the UWB-OFDM modem communicates with data terminals situated in different directions.

12. A radiocommunication method comprising at least the following steps:
   generating an Orthogonal Frequency Division Multiplex (OFDM) modulation-based waveform by using an ultra-wideband-Orthogonal Frequency Division Multiplex (UWB-OFDM) modem by increasing a duration of an OFDM symbol by reproducing a Fast Fourier Transform (FFT) pattern,
   transposing the waveform into a frequency band adapted to a given frequency scan antenna, and
   transmitting the waveform to a receiver.

* * * * *